United States Patent [19]

Horton et al.

[11] Patent Number: 4,945,563

[45] Date of Patent: Jul. 31, 1990

[54] VIDEO SYSTEM AND METHOD FOR CONTROLLED VIEWING AND VIDEOTAPING

[75] Inventors: Edwin T. Horton, Ballwin, Mo.; Edward W. Smith, Lake Arrowhead, Calif.

[73] Assignee: Satellite Technology Services, Inc., St. Louis, Mo.

[21] Appl. No.: 247,844

[22] Filed: Sep. 22, 1988

Related U.S. Application Data

[63] Continuation-in-part of Ser. No. 927,169, Nov. 5, 1986, abandoned.

[51] Int. Cl.[5] ........................ H04N 7/167; H04H 1/02

[52] U.S. Cl. .......................................... 380/5; 380/10; 380/20; 358/84; 358/86; 455/2; 455/5; 455/6; 360/60

[58] Field of Search ........................................ 380/3–5, 380/9, 10, 23, 20; 360/60; 358/84, 86; 455/2–6

[56] References Cited

U.S. PATENT DOCUMENTS

| | | | |
|---|---|---|---|
| 3,963,865 | 6/1976 | Songer | 380/5 |
| 4,030,128 | 6/1977 | Perret | 380/5 |
| 4,057,829 | 11/1977 | Moorehead | 358/86 |
| 4,100,575 | 7/1978 | Morio et al. | 380/5 |
| 4,115,807 | 9/1978 | Pires | 380/20 |
| 4,130,833 | 12/1978 | Chomet | 380/13 |
| 4,163,253 | 7/1979 | Morio et al. | 380/5 |
| 4,163,255 | 7/1979 | Pires | 380/20 |
| 4,213,149 | 7/1980 | Janko | 380/5 |
| 4,272,791 | 6/1981 | Rifken | 380/13 |
| 4,305,101 | 12/1981 | Yarbrough et al. | 360/69 |
| 4,308,554 | 12/1981 | Percy et al. | 358/84 |
| 4,475,129 | 10/1984 | Kagota | 380/5 |
| 4,484,217 | 11/1984 | Block et al. | 358/84 |
| 4,486,773 | 12/1984 | Okubo | 358/84 |
| 4,507,680 | 3/1985 | Freeman | 358/86 |
| 4,528,588 | 7/1985 | Löfberg | 380/5 X |
| 4,577,216 | 3/1986 | Ryan | 380/5 |
| 4,595,950 | 6/1986 | Löfberg | 380/5 |
| 4,598,288 | 7/1986 | Yarbrough et al. | 380/23 X |
| 4,603,349 | 7/1986 | Robbins | 380/19 |
| 4,605,973 | 8/1986 | Von Kohorn | 358/335 |
| 4,608,456 | 8/1986 | Paik et al. | 380/28 |
| 4,611,242 | 9/1986 | Williams | 380/20 |
| 4,613,901 | 9/1986 | Gilhousen et al. | 380/20 |
| 4,628,359 | 12/1986 | Okada et al. | 380/20 |
| 4,694,490 | 9/1987 | Harvey et al. | 380/9 X |
| 4,704,725 | 11/1987 | Harvey et al. | 380/9 |

*Primary Examiner*—Stephen C. Buczinski
*Assistant Examiner*—Bernarr Earl Gregory
*Attorney, Agent, or Firm*—Rogers, Howell & Haferkamp

[57] ABSTRACT

A satellite TV or cable video receiver includes a decoder for decoding information embedded in a broadcasted TV program which can be utilized to permit an operator to select the program for viewing only, or viewing and the preparation of a copy of the program. In an alternate embodiment, the operator may also select and the receiver permit the preparation of a copy inhibited tape. With this receiver, first run movies may be displayed on a tape or view basis without destroying the after-market for the film.

20 Claims, 2 Drawing Sheets

24 22 26 28 30 32 34 38 40 42 44 46
BILLING INFO
TO BILLING
DESCRAMBLE
DECODE
MONITOR
OPERATOR SELECT
ANTI-TAPE
VCR
REMOTE CONTROL

TO BILLING
MONITOR
VCR
BILLING INFO
DECODE
ANTI-TAPE
DESCRAMBLE
OPERATOR SELECT
REMOTE CONTROL 22
24
26
28
30
32
34
38
40
42
44
46

VIDEO SYSTEM AND METHOD FOR CONTROLLED VIEWING AND VIDEOTAPING

CROSS REFERENCE TO RELATED APPLICATION

This application is a continuation-in-part of Ser. No. 06/927,169, filed Nov. 5, 1986, now abandoned.

BACKGROUND AND SUMMARY

In recent years, there has been an ever-increasing utilization of satellite television systems (TVRO) and cable TV which has created an increased demand by an ever-increasing audience for programming beyond the typical programming presently commercially available. This has led to the development of premium channels and other "special event" premium programming which is accessible only upon the payment of an additional fee, i.e. such as in pay-per-view (PPV) which permits a viewer of specific special event programming to pay a surcharge for the privilege of viewing the "special event" over his cable TV connection. Such "special events" have included major sporting events, first run movies, and other programming which is not ordinarily commercially available. This has met with wide success and has greatly enhanced the desirability of subscribing to a cable TV system, or alternatively owning a satellite television system. However, there are some limitations to the "special event" programming available even through the PPV and similar systems because of the advent of VCR technology. Presently, those "special event" programs available to PPV systems, including especially movies, are timed to coincide with the end of the theatrical or "first run" release of those events in movie houses, and with the release of those "special events" for videotape sale and rental. While this is generally before the "special events" have been released to the premium cable TV channels such as HBO, Showtime, etc., this can still be several months after the theatrical release. Generally this policy is followed because of the inability of the cable TV and other distribution systems to prevent unauthorized taping of the "special event" and mass tape reproduction which would destroy its marketability for videotape sales and rentals. Therefore, there are virtually no first run movies which are distributed by the PPV systems and, instead, film revenue is generally collected for showing films at the movie houses, over the premium channels, and subsequently after the films have been placed in general release through videotape sales and rentals. Although the PPV market represents a significant market and could dramatically add to the revenue to be gained in the distribution of "special events", and especially first run movies, this inability to permit viewing while preventing unauthorized reproduction of a TV program transmitted by satellite or over cable has eliminated it as a source of revenue. Furthermore, the ability to program first run movies in a PPV mode would greatly enhance a premium channel's desirability and significantly increase its utilization and acceptance by the general viewing public.

Most videotapes which are sold and made available for rental are presently produced in a "copy protected" format to inhibit the unauthorized duplication of the videotape and preserve the market. This copy protected format permits the videotape to be played back on a VCR and viewed, but copies duplicated onto a blank cassette have serious distortion induced in them which virtually eliminates their entertainment and resale value. While these copy protected formats are reasonably effective, there are limitations in their effectiveness and their non-interference with playback in that the videotape must be capable of playback in all types of VCRs, and the tape encoded signal must produce a viewable signal.

In addition to the copy protected format, there has been developed in the prior art a scheme for embedding a signal in a broadcasted TV program which introduces distortion into any copies made. This formatting is generally more secure and introduces less distortion into the TV program than the copy protected format as the program is directly viewed from the broadcast signal and does not have to be capable of recording and playback from a recorded signal. This type of formatting is generally referred to as "anti-taping". By utilizing this existing technology, the inventor herein has succeeded in developing two systems which for the first time makes it feasible to sell a program on a PPV basis without destroying other secondary markets, thereby adding another layer of revenue-producing distribution for first run movies and other "special event" programming.

Both of the inventor's systems are capable of receiving TV programming which has been encrypted or "scrambled" as are many premium channels presently being broadcast over cable and satellite systems such as HBO, Showtime, etc. However, in the first embodiment these encrypted programs carry an additional tag or code which is deciphered by the receiver to indicate whether the program may be taped or not. The operator then has the ability to select either view only, or view and tape modes of reception. The receiver generates billing information which can be transmitted to a billing authority to properly charge the viewer for his selected mode of viewing and/or taping the program. In the viewing only mode, the program is processed by an anti-taping circuitry resident in the receiver which encodes the TV program signal such that no tape with any entertainment or resale value can be made of the program and it can only be viewed. In the view and tape mode, the TV program is processed by a copy protected circuit resident in the receiver which modifies the signal so that the TV program may be viewed and also transcribed onto a first video cassette by a special VCR to generate a single copy of the program. However, the recorded program is itself "copy protected" such that if subsequent copies of the first cassette are made with a standard VCR, distortion is introduced which significantly impairs their viewability. By utilizing this technology in this manner, the inventor herein has succeeded in designing and developing a system which is ideal for the distribution of special events such as first run movies. In a typical transaction, a first run movie would be broadcast over the cable system, or through a satellite TV distribution system, to its subscribers. Any subscriber would have the option of choosing to merely view the programming for which he would pay a first fee, or he could choose to view the programming as well as create a first copy of the program upon the payment of a second higher fee. This second fee would include a charge related to the purchase price of a cassette of the program. However, this level of distribution would not destroy subsequent sales of prerecorded tapes or rental thereof as the first copy recorded by the viewer on his special VCR would be copy protected to inhibit a pirate from making additional usable copies and selling them.

In a second alternate embodiment, the copy protect mode is eliminated from the system. This does not provide the advantage of permitting an operator to make a single tape with his special VCR. On the other hand, any VCR can be connected to the system of this embodiment to make a copy. Thus, the system of the second embodiment is somewhat simpler and less expensive which can be a factor as each home should have one of the systems of the present invention. Furthermore, the ability to use the system with a standard VCR makes it more versatile in that many homes presently have one or more standard VCRs.

The foregoing has been a brief overview of the system and some of its features. A more thorough understanding may be gained by referring to the drawing and the detailed description of the preferred embodiment which follows.

DETAILED DESCRIPTION OF THE PREFERRED EMBODIMENT

Figure 1:
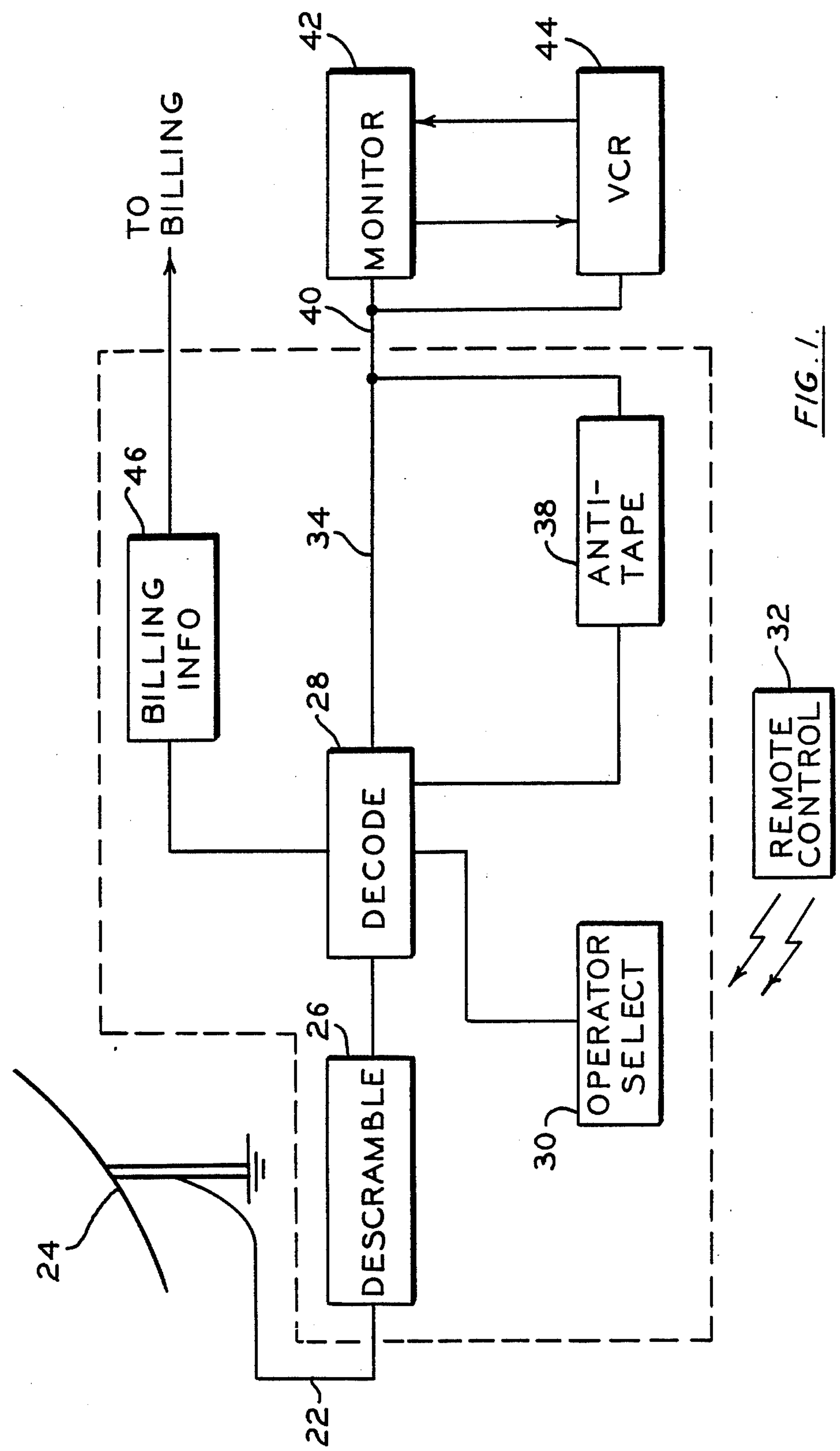
FIG. 1 is a schematic diagram of a receiver incorporating the features of the present invention, including the copy protect feature.

As shown in FIG. 1, a receiver 20 receives a signal along cable 22 from a satellite dish 24 or, alternatively, from a cable system, as is well known in the art. Although not depicted in the figure, receiver 20 could also incorporate the necessary circuitry to process a satellite TV signal at a higher frequency band but such circuitry is not required for cable TV. The receiver 20 includes a descrambling circuit 26 which descrambles the television program and feeds it to a decoder 28. The decoder 28 decodes the coded information embedded in the TV signal and provides an indication to an operator of the various modes available with this particular program. These modes may be displayed and input by an operator select circuit 30 which is accessible through an operator remote control 32. The modes which may be made available include view only, view and tape for fee, and view and tape for free. Depending upon the mode selected, the TV program will then be routed along conductor 34 corresponding to view and tape for free; or through the copy protect circuit 36 where it would be formatted for to view and tape for a fee; or through antitape circuitry 38 where it would be formatted for view only. After being formatted, as appropriate, the television program is output along conductor 40 for connection to a user's monitor 42, or special VCR 44, as desired. Additionally, the decoder 28 would provide billing information to the billing info store and hold circuit 46 which can be transmitted at a convenient time to the proper billing authority so that the user can be billed according to the mode he has selected.

As an alternative to the billing info hold and store circuit 46, the program may be further encoded such that the cable TV or satellite distribution system can pre-authorize the receiver 20 to receive the program and also to indicate the mode of reception. In such a case, the pre-authorization would eliminate the need for billing info hold and store circuit 46 as the billing information would be generated from the central office.

To enhance the safety and convenience of the system, the decode circuit 28 has a direct access line through conductor 48 to VCR 44 so that the program could be encoded to automatically initiate recording, or, alternatively, the remote control 32 or operator select 30 could permit an operator to program operation of the VCR 44 for those programs authorized to be taped. It is believed that this control over VCR 44 would also help minimize the multiple connection of VCRs to output conductor 40 as might be attempted by an operator to make multiple copies. Without this protective enabling circuit through conductor 48, an operator might seek to make multiple copies by connecting multiple VCRs to output conductor 40 along with an appropriate amplifier or line splitter. However, this is seen as a minor problem in that a separate special VCR would need to be connected for each extra copy desired which dramatically decreases the ability of a pirate to produce a large number of copies.

As a further feature and addition to the versatility of the receiver 20, there may be some programs which are offered on a "sneak preview" basis such that the operator may reduce or even eliminate the billing charge if he will provide answers to selected questions which can be displayed on his monitor 42 and for which he may utilize his remote control 32 or operator select circuitry 30 to enter the appropriate responses. Generally, these "sneak preciews" would be provided on a view only basis and would not be available for taping. With this arrangement, "sneak preview" data can be collected virtually instantaneously and the results utilized almost immediately to determine the desired feedback information as used to control the marketing and distribution of first run movies.

Figure 2:
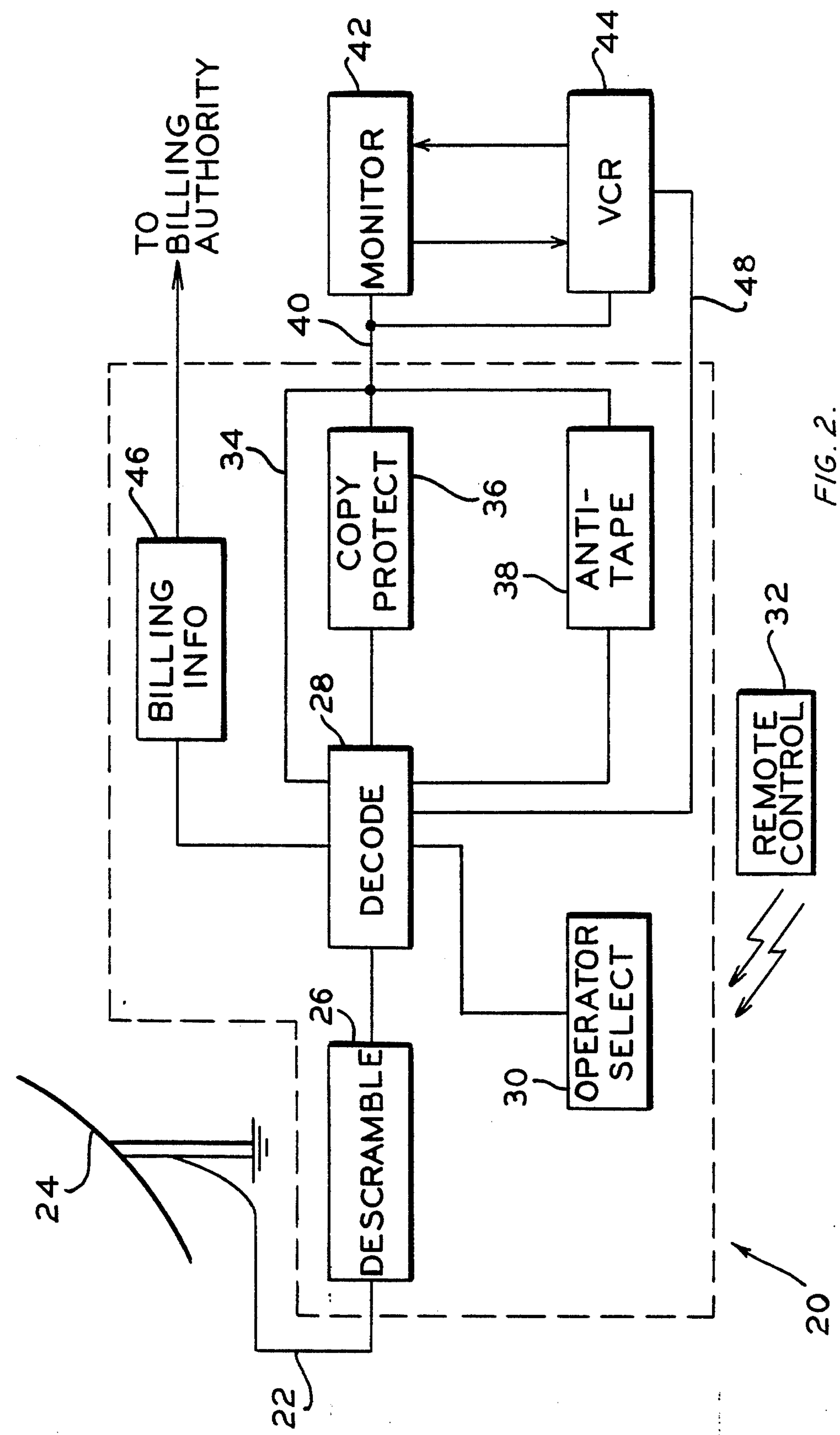
FIG. 2 is a schematic diagram of a receiver similar to that shown in FIG. 1 except without the copy protect feature.

A second, somewhat simplified, embodiment is shown in FIG. 2 and includes most of the same features as the embodiment shown in FIG. 1 with the exception that a copy protect circuit 36 is not included. This limits the ability of the operator to select for viewing a program for which one copy may be made. In other words, any copies made with the system of the second embodiment are made on a standard VCR and those copies are not "copy protected" from the standpoint that additional copies of that copy may be made with standard VCRs.

Thus, this system of the second embodiment as shown in FIG. 2 does provide a somewhat simpler system which, hence, is less expensive and therefore more desirable for distribution to a large number of households. Additionally, this system will work with a standard VCR and does not require a connection to a special VCR to make copy protected cassettes of any desired and selected program. On the other hand, it does limit the facility with which these systems may be used to broadcast selected kinds of programming in that once a viewer is permitted to make a copy, further copying of that copy may be made in an unrestricted manner.

There are various changes and modifications which may be made to the invention as would be apparent to those skilled in the art. However, these changes or modifications are included in the teaching of the disclosure, and it is intended that the invention be limited only by the scope of the claims appended hereto.

We claim:

1. A video reception system for receiving encrypted premium TV programs and formatting said TV programs to control videotaping thereof, said programs being encoded to indicate that recording thereof is either permitted or not permitted, said system comprising a receiver, the receiver including: means to descramble the encrypted TV program, means to decode the program code, means to permit operator selection of a program code, means to format said TV program for unrestricted viewing and taping, and means to format said TV program for viewing but not taping thereof.

2. The system of claim 1 further comprising means to generate billing information corresponding to the operator selected program code.

3. The system of claim 2 further comprising means to alter said billing information in response to operator input of responses to pre-selected questions.

4. The system of claim 1 further comprising means to enable a VCR for recording of the TV program.

5. The system of claim 1 wherein said operator selection means includes a remote control means.

6. The system of claim 1 further comprising means to format said TV program to permit a copy inhibited recording to be made thereof.

7. The system of claim 1 further comprising means to transmit said billing information via a telecommunication means.

8. The system of claim 1 wherein said receiver comprises part of a TVRO satellite television reception system.

9. A method for receiving and formatting encrypted television programs to control the videotaping thereof, said TV programs being encoded to indicate that recording thereof is either permitted or not permitted, said method comprising the steps of: descrambling the encrypted TV program; decoding the program code; selecting the desired code; and formatting said received TV program to permit viewing only or to permit unrestricted viewing and taping.

10. The method of claim 9 wherein the step of formatting includes the alternative of permitting a copy inhibited reproduction to be created.

11. The method of claim 9 further comprising the step of generating billing information corresponding to the selected program code.

12. The method of claim 11 further comprising the step of altering the billing information in response to operator input of requested information.

13. A satellite television TVRO receiver for receiving encrypted premium TV programs and formatting said TV programs to control videotaping thereof, said programs being encoded to indicate that recording thereof is either permitted or not permitted, said receiver including: means to descramble the encrypted TV program; means to decode the program code and display same for operator selection; means to permit operator selection of a program code corresponding to either recording permitted or recording not permitted; and means to format said TV program for viewing but to prevent taping thereof in response to operator selection of a program code corresponding to taping not permitted.

14. The device of claim 13 further comprising means to format said TV program to permit a copy inhibited recording to be made thereof by insertion of copy protection signal in response to operator selection of a program code corresponding to recording permitted.

15. The receiver of claim 13 further comprising means to generate billing information corresponding to the operator selected program code.

16. The receiver of claim 15 further comprising means to alter said billing information in response to operator input of responses to pre-selected questions.

17. The receiver of claim 13 further comprising means to enable a VCR for recording of the TV program.

18. A receiver for connection to a cable TV system, said receiver having means for receiving encrypted premium TV programs and formatting said TV programs to control videotaping thereof, said programs being encoded to indicate that recording thereof is either permitted or not permitted, said receiver including: means to descramble the encrypted TV program; means to decode the program code and display same for operator selection; means to permit operator selection of a program code corresponding to either recording permitted or recording not permitted; and means to format said TV program for viewing but to prevent taping thereof in response to operator selection of a program code corresponding to taping not permitted.

19. The device of claim 18 further comprising means to format said TV program to permit a copy inhibited recording to be made thereof by insertion of a copy protection signal in response to operator selection of a program code corresponding to recording permitted.

20. The receiver of claim 18 further comprising means to generate billing information corresponding to the operator selected program code.

* * * * *